United States Patent [19]

Shimp et al.

[11] Patent Number: 4,491,968
[45] Date of Patent: Jan. 1, 1985

[54] STATUS MONITOR

[75] Inventors: Richard L. Shimp, Harrisonburg; Dennis A. Zimmerman, Rockingham County, both of Va.

[73] Assignee: ComSonics, Inc., Harrisonburg, Va.

[21] Appl. No.: 482,961

[22] Filed: Apr. 7, 1983

[51] Int. Cl.³ .................. H04B 3/46; H04B 17/00
[52] U.S. Cl. ...................... 455/67; 179/170 F; 179/175.3 F; 307/361; 324/96; 324/133; 340/511; 340/661; 340/870.16; 455/9
[58] Field of Search .............. 455/3, 4, 9, 67, 115; 331/65, 179; 307/360, 361; 328/147; 324/52, 96, 120, 122, 133; 179/170 F, 175.2 C, 175.3 F; 340/870.16, 511, 514, 539, 661

[56] References Cited

U.S. PATENT DOCUMENTS

| 3,731,203 | 5/1973 | Lieberman | 455/9 |
| 3,956,697 | 5/1976 | Néry | 324/133 |
| 4,210,902 | 7/1980 | Palekhin et al. | 340/870.16 |
| 4,413,229 | 11/1983 | Grant | 324/52 |
| 4,424,458 | 1/1984 | Buck et al. | 307/361 |

Primary Examiner—Marc E. Bookbinder
Attorney, Agent, or Firm—C. Lamont Whitham

[57] ABSTRACT

A status monitor for coaxial cable networks is disclosed. The monitor is designed to be directly attached to an output port of an amplifier/repeater in the network and is used as an aid in trouble shooting faults in the network. The monitor comprises a detector (12 or 40) which generates a d.c. voltage indicative of the level of a pilot frequency signal on the network. This d.c. voltage is supplied to a plurality of voltage comparators (18, 20 and 22) which compare the d.c. voltage with different reference voltages in order to sense different fault conditions. If a fault condition is sensed, the outputs of the comparators are used by a tone selection logic (24) and an OR logic switch (26) to control a voltage controlled oscillator (28) to generate a modulating tone. A signal from a crystal controlled oscillator (32) or an IF output of the detector (40) is modulated by the tone produced by the voltage controlled oscillator and radiated. This tone modulated radiated signal may then be used by a technician in the field to detect both the location and the nature of the sensed fault in the network.

6 Claims, 2 Drawing Figures

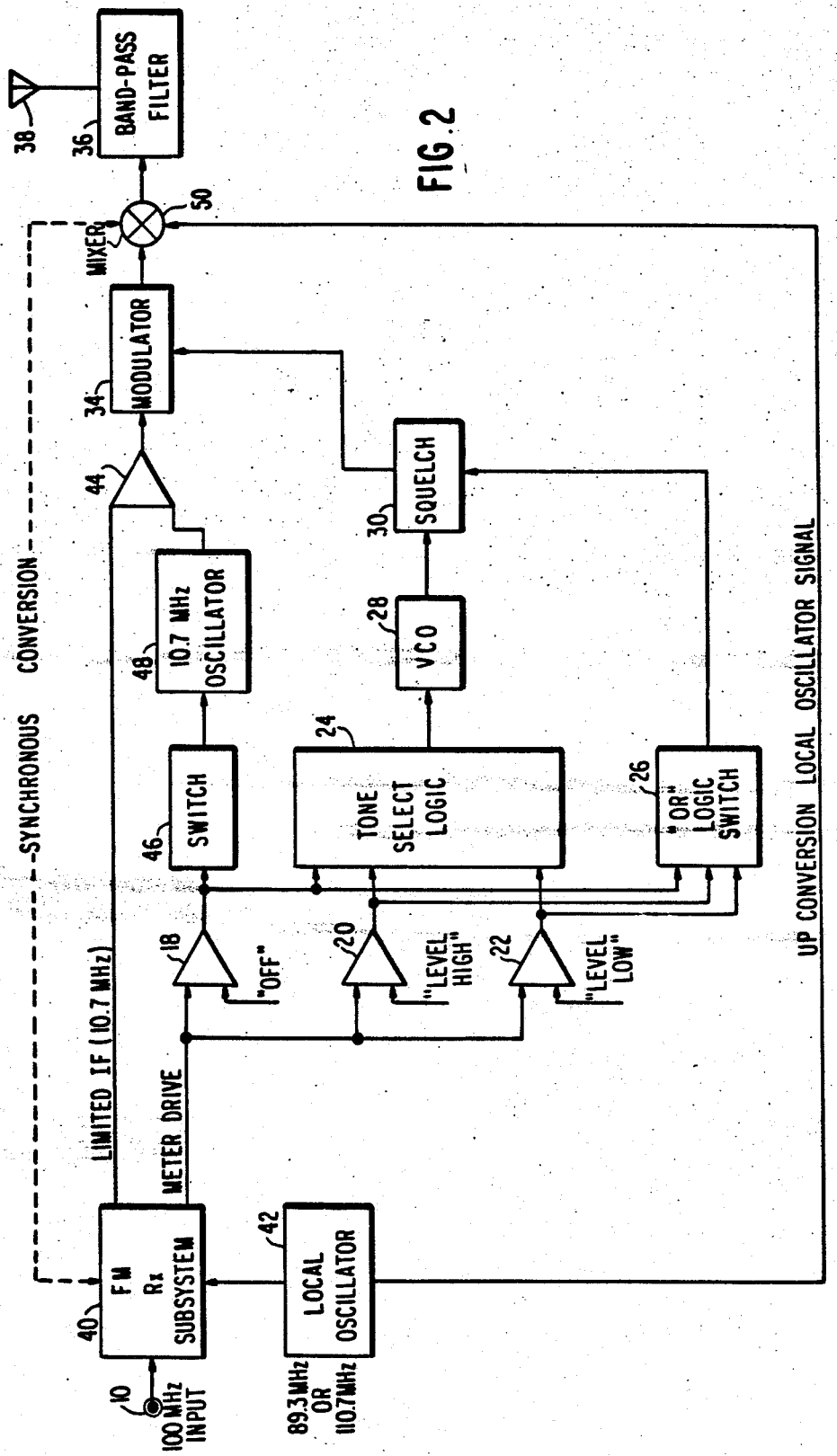

STATUS MONITOR

FIELD OF THE INVENTION

The present invention is directed to the art of isolating a faulty amplifier/repeater station within a series of such stations in a coaxial cable network.

BACKGROUND OF THE INVENTION

Trouble shooting cable television systems is a very difficult endeavor because such systems and their associated electronics are spread diversly over a large geographical area. The majority of systems are one-way with signals originating at a headend and being transmitted to many extremities. Failure of any one component in the chain is never witnessed or acknowledged at the central operations point. A subscriber loss of service complaint, received via telephone, is normally the first notification of a malfunction. However, as reported by the subscriber, it is often very difficult to judge the nature of the problem. A report of "no picture" can be a symptom resulting from a problem as severe as a total CATV system outage to simply the failure of the subscriber's television set which has no bearing on the cable plant operation.

Once a complaint has been lodged in a system operations center, the technical staff is dispatched to drive the length of the cable system in question, stopping occasionally to determine whether the signal is present at that point or if the problem is further down the line. Many times, this trouble shooting technique involves knocking on doors and asking subscribers to view their television receivers to see if they have the same complaint. This is both inconvenient and troublesome to the subscribers, very time consuming and therefore costly to the cable operator.

In order to ensure the integrity of shielding and thus minimizing intolerable interference from sources outside the coaxial environment and to comply with regulatory agency rules, most operators of networks place a uniquely encoded signal within their network, the sole purpose of which is to test for unacceptable radiation from the network. Using a detecting device with known characteristics, the user of the detecting device may isolate the location of any area within the network which exceeds predetermined radiation levels. Leakage in excess of established limitations can be traced to a lack of shielding integrity which will allow equally reciprocal amounts of ingress and egress. In most instances, tolerable ingress must be much less than regulatory agency rules allow in order to avoid interference to desired signals from those outside the network.

In the ideal network, one should expect never to sense the radiation control signal. It is therefore obvious that the same signal which is placed on the coaxial network for purposes of radiation monitoring cannot also be used directly to assist the network operator to isolate the location of an amplifier/repeater station which is malfunctioning. However, this signal can be used as a pilot signal the level of which can be sensed by interface hardware physically mounted directly to the output port of an existing broadband network amplifier. Duplicating the use of an existing signal is of extreme importance to the network operator as no additional bandwidth is required for non-revenue purposes.

SUMMARY OF THE INVENTION

It is therefore an object of the invention to provide a status monitor that will improve trouble shooting procedures in a coaxial network.

It is another object of the invention to provide a module that may be directly connected to the output port of a trunk amplifier and will monitor transported signals, continually comparing the real status with predetermined performance characteristics as are required for satisfactory coaxial network operation.

It is a further object of the invention to provide a status monitor particularly adapted for use in CATV systems that will allow more effective, speedy trouble shooting, therefore resolving system problems faster with substantially less effort than conventional trouble shooting techniques.

The status monitor according to the present invention is provided with a detector which generates an output d.c. voltage proportional to the level of the monitored pilot signal. This d.c. voltage is tested in a window comparator to determine if the monitored signal is within prescribed levels. The d.c. voltage is also monitored to determine if it is absent which, in most cases, is an indication of the absence of plant power. Logical switching circuitry is used to develop several different signals each representing a specific fault which may be used to modulate a very low powered oscillator or the monitored pilot signal, if it is present. The modulated signal is radiated so that it may be detected by a specialized receiver. This approach to trouble shooting allows a technician to find and solve the majority of cable television problems in an expeditious manner. In fact, CATV system status can be determined without actual physical contact. This is especially advantageous during inclement weather and at night when measuring levels in a system becomes quite burdensome. Each sympton detected by the technician using the specialized receiver could suggest a different course of action based on the readings obtained at adjacent stations.

BRIEF DESCRIPTION OF THE DRAWINGS

The foregoing and other objects, aspects and advantages of the invention will be better understood from the following detailed description of two preferred alternative embodiments with reference to the drawings, in which:

FIG. 2 is a block diagram of a second embodiment of the invention in which the pilot signal, when present, is modulated to generate a radiated signal indicating the nature of the malfunction detected.

DESCRIPTION OF THE PREFERRED EMBODIMENTS

Figure 1:
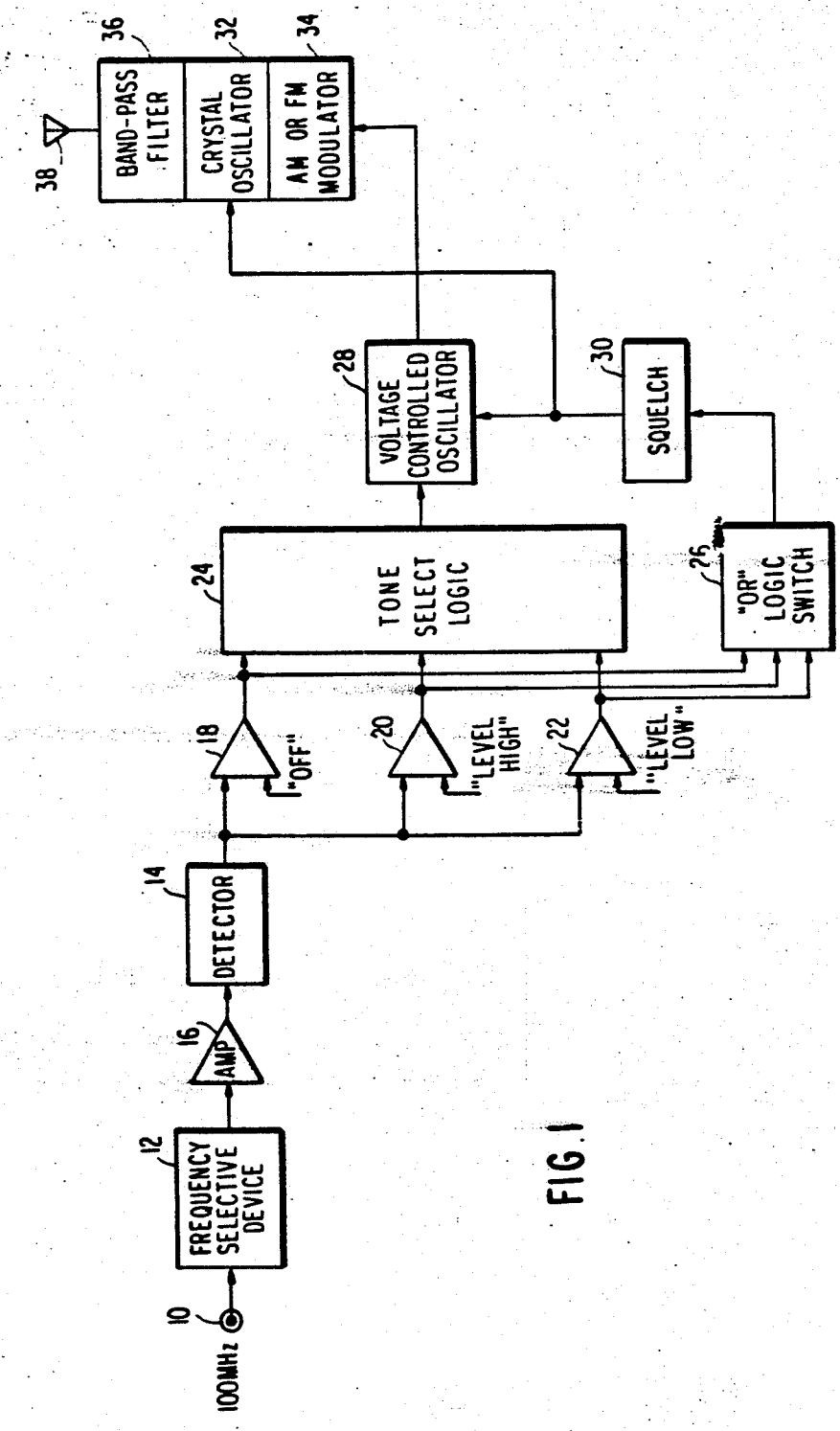
FIG. 1 is a block diagram of a first embodiment of the invention in which a crystal oscillator is modulated to generate a radiated signal indicating the nature of the malfunction detected.

Referring now to the drawings, and more particularly to FIG. 1, the status monitor has its input 10 connected directly to the output port of a trunk amplifier (not shown). In the illustrated example, the pilot signal has a frequency of 100 MHz; therefore, a frequency selective device 12, such as a narrow bandpass filter, is used to pass this frequency. The output of device 12 is supplied to a detector 14 via a buffer or isolation amplifier 16. The output of the detector 14 is a d.c. voltage which is proportional to the 100 MHz pilot signal input level and therefore is an indirect but accurate indication of the actual r.f. level of cable plant signal carriage.

The d.c. voltage from detector 14 is supplied to the inputs of three voltage level comparators 18, 20 and 22. The comparators 20 and 22 respectively determine if the input d.c. voltage level from detector 14 is above or below predefined reference voltages. Thus, these comparators form a window detector. Comparator 18 on the other hand serves to detect the presence or absence of the pilot signal. If the d.c. voltage supplied to the comparators 18, 20 and 22 is not within the limits prescribed by the corresponding reference voltages supplied to the comparators, the output of the corresponding comparator will switch from one voltage level to another.

The outputs of the comparators 18, 20 and 22 are supplied to a tone select logic 24 and an OR logic switch 26. The tone select logic is composed of switched voltage dividers which provide a different output voltage for each of the faults that may be detected. The output voltage from one of these voltage dividers is used to control the oscillating frequency of a voltage controlled oscillator (VCO) 28. This oscillator is normally turned off by the squelch circuit 30, but it is toggled on when any one of the comparators 18, 20 or 22 is tripped as detected by the OR logic switch 26.

The crystal oscillator 32 is also normally turned off by the squelch circuit 30, but it is also toggled on when any one of the comparators 18, 20 or 22 is tripped as detected by the OR logic switch 26. When the VCO 28 and the crystal oscillator 32 are toggled on, the output of the VCO 28 is used as the modulating input to modulator 34 which may be either an amplitude modulator or a frequency modulator. In the preferred embodiment, modulator 34 is switchable to select either AM or FM so that the coaxial network operator can make the selection on installation. In either case, the modulator 34 modulates crystal oscillator 32 with the output of the VCO 28 which has a frequency indicative of a particular fault. The output of the crystal oscillator 32 is passed by a bandpass filter 36 and radiated by antenna 38. The radiated signal can then be detected by a technician in the field using a radio receiver designed for the purpose.

The embodiment shown in FIG. 2 differs from that of FIG. 1 in that instead of using a crystal controlled oscillator to generate the radiated signal, a pilot signal is used for this purpose when it is present on the cable. In FIG. 2 the same reference numerals as used in FIG. 1 designate the same or corresponding parts. Instead of a detector to generate a d.c. voltage, the input 10 is connected to the input of an FM receiver subsystem 40. A local oscillator 42 provides the required mixing signal for the FM receiver subsystem 40 to produce an intermediate frequency output of 10.7 MHz, for example. The FM subsystem is used as the input device for three reasons. Inherent in such a subsystem is limiting of the received pilot signal which serves to remove or substantially reduce the amount of amplitude modulation which may be present on this signal. In addition, the limiting action automatically clamps the amplitude of the signal thus ensuring a solid base from which to provide radiated energy control and therefore compliance with regulatory agency rules. Finally, integrated circuit FM subsystems usually have as normal outputs either a d.c. tuning meter drive voltage or unlimited IF from which can be derived a d.c. voltage proportional to sensed level. In FIG. 2, the former case is illustrated with the d.c. meter drive voltage being supplied to the inputs of the comparators 18, 20 and 22.

The operation of the comparators 18, 20 and 22, the tone switch logic 24, the OR logic switch 26, the VCO 28, and the squelch circuit 30 is substantially the same as described with respect to the embodiment shown in FIG. 1. The output of the VCO 28 is supplied to the modulator 34 as before, but instead of modulating the output of a crystal controlled oscillator, the limited IF signal from the FM subsystem 40 is modulated. Actually, there are two separate sources of 10.7 MHz carrier which may be supplied to the modulator 34 by a signal combiner 44 depending on which fault is sensed at the 100 MHz input. Obviously, if power fails, the FM subsystem 40 will receive no input and therefore cannot produce a 10.7 MHz IF input to the signal combiner 44. Comparator 18 recognizes this case and provides an indication of logical state change to switch 46 as well as the tone select logic 24. Switch 46 enables an auxiliary 10.7 MHz crystal controlled oscillator 48, the output of which is connected to the other input of the signal combiner 44. Thus, even when power fails, the modulator 34 will be supplied with a 10.7 MHz carrier which is modulated with a tone indicating the nature of the fault detected.

To ensure that the signal radiated from antenna 38 is precisely the signal frequency sensed at the input 10, restoration is accomplished by heterodyning the derivative 10.7 MHz IF with a sample of the same local oscillator 42 used in the down conversion in FM receiver subsytem 40. In other words, a synchronous conversion is employed for down conversion and up conversion. Unwanted spurious components created by the mixer 50 are suppressed in bandpass filter 36.

From the foregoing description, it will be appreciated that the status monitor according to the invention is normally quiescent with no signal radiated by the antenna 38. It is only when a fault is sensed that a tone modulated signal is radiated enabling a technician in the field to easily detect both the location and nature of the fault. Those skilled in the art will recognize that the invention can be modified from the two specific embodiments disclosed and can be used in a wide variety of coaxial networks and is not limited to CATV systems. For example, more or less number of faults may be detected and in the limiting case where only one fault condition is monitored, the tone selection logic 24 and related modulating circuitry can be eliminated. However, it is contemplated that the most desirable system will be designed to monitor a variety of possible faults as in the two disclosed preferred embodiments. With respect to the disclosed embodiments, the choice of one or the other may be determined by applicable regulatory agency rules.

We claim:

1. A status monitor for use in a coaxial cable network comprising:
   detector means connected to said coaxial cable network for providing a d.c. output indicating the level of a signal on said network;
   signal generating means responsive to said detector means for selectively generating one of a plurality of signals representing a respective one of a plurality of fault conditions including no signal being detected on said network or the signal detected being outside an amplitude window defined by predetermined upper and lower reference levels, said signal generator means generating said one signal only when said respective one of said plurality of fault conditions is detected; and
radiating means connected to said signal generating means for radiating a signal generated thereby.

2. A status monitor as recited in claim 1 wherein said detector means comprises window detection means for measuring a signal on said network against said upper and lower reference levels in order to detect corresponding faults, said signal generating means further comprising tone generating means responsive to said detector means for producing a respective modulating signal indicative of a particular fault condition.

3. A status monitor as recited in claim 1 wherein said detector means comprises:
a first detector responsive to a predetermined pilot frequency signal on said coaxial cable network, said first detector generating a d.c. voltage output indicating the level of said pilot frequency signal;
at least first, second and third comparators each connected to receive the d.c. voltage output from said first detector, each of said comparators also being supplied with a different reference voltage corresponding to different levels of the sensed pilot frequency signal;
and said signal generating means further comprising tone generation means responsive to the outputs of said first, second and third comparators for generating different tones corresponding to the outputs of said comparators; and
modulation means for modulating a carrier signal with a tone generated by said tone generation means, said radiating means radiating said modulated carrier signal.

4. A status monitor as recited in claim 3 wherein said tone generation means comprises:
tone selection logic for producing different voltages depending on the outputs of said first, second and third comparators;
a normally squelched voltage controlled oscillator responsive to the output of said tone selection logic to generate a modulating tone; and
toggling means responsive to the outputs of any one of said first, second or third comparators for toggling said voltage controlled oscillator on.

5. A status monitor as recited in claim 4 wherein said signal generating means includes a normally squelched crystal controlled oscillator to supply said carrier signal which is modulated by said modulation means with the output of said voltage controlled oscillator, said crystal controlled oscillator being toggled on by said toggling means in response to a fault sensed by any one of said first, second or third comparators.

6. A status monitor as recited in claim 4 wherein said first detector is an FM receiver subsystem which produces in addition to said d.c. voltage a limited IF signal, said status monitor further comprising:
switch means responsive to one of said first, second or third comparators for turning said signal generating means on in the event that no pilot frequency signal is detected on said coaxial cable network;
signal combiner means connected to supply either said limited IF signal or a signal from said signal generating means to said modulation means for modulation by a tone from said voltage controlled oscillator; and
mixer means for synchronously up converting the tone modulated signal.

* * * * *